Figure 1:
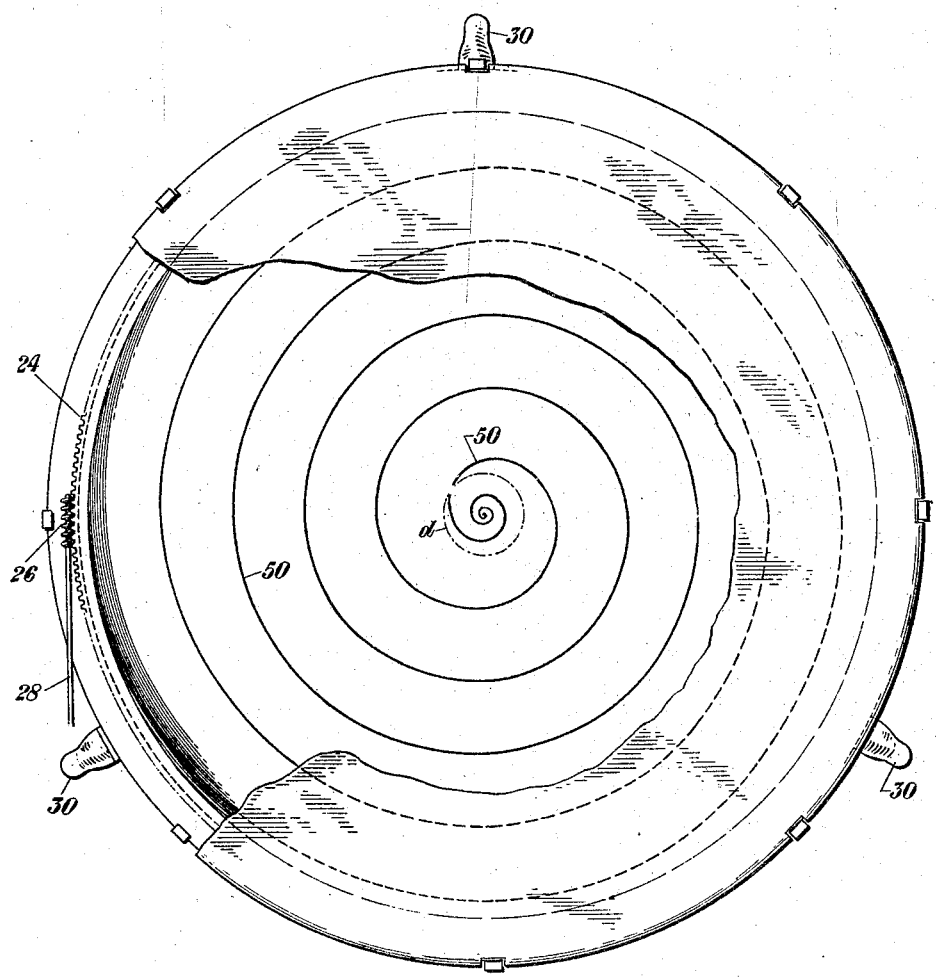

March 22, 1927.

H. S. SAWFORD 1,621,813

SCREEN FOR REDUCING SECONDARY RADIATION FROM X-RAYS

Filed Jan. 26, 1924 4 Sheets-Sheet 1

INVENTOR
Harold S. Sawford
BY
ATTORNEYS.

March 22, 1927. 1,621,813
H. S. SAWFORD
SCREEN FOR REDUCING SECONDARY RADIATION FROM X-RAYS
Filed Jan. 26, 1924 4 Sheets-Sheet 3

INVENTOR
Harold S. Sawford
BY
ATTORNEYS.

March 22, 1927. 1,621,813
H. S. SAWFORD
SCREEN FOR REDUCING SECONDARY RADIATION FROM X-RAYS
Filed Jan. 26, 1924 4 Sheets-Sheet 4

INVENTOR
Harold S. Sawford
BY
his ATTORNEYS.

Patented Mar. 22, 1927.

1,621,813

UNITED STATES PATENT OFFICE.

HAROLD S. SAWFORD, OF BROOKLYN, NEW YORK.

SCREEN FOR REDUCING SECONDARY RADIATION FROM X RAYS.

Application filed January 26, 1924. Serial No. 688,761.

The present invention relates to screens used in connection with X-rays for reducing the secondary radiation caused by the passage of the X-rays thru the object to be examined or radiographed. More specifically stated, the invention relates to screens for this purpose adapted to be interposed between the plate or film and the object to be radiographed, said screen being rotated during the radiographic exposure so that the portions of the screen which are impervious to X-rays will not cast shadows upon the plate or film. Such screens have been characterized by ribbons of lead or other material impervious to X-rays spaced from one another by some material transparent to X-rays. A screen of this type is shown in the United States Patent to Buck, 1,465,340; and the present invention may be regarded as an improvement upon this particular type of screen, altho, in its broader aspects, it need not be regarded as limited to usefulness in a screen of that particular type.

It is highly desirable that the thickness of screens of the type above mentioned be reduced to a minimum, in order that the object to be radiographed may be located as closely as possible to the plate or film. It will be obvious, however, that the thickness of the screen can only be reduced, without sacrificing its efficiency, by reducing the width of the lead ribbons and by arranging the latter very close together. When, however, an attempt is made to construct a screen in this manner with a single spiral of lead ribbon, it is found that altho theoretically every point in the ribbon is at a different radial distance from the center of the spiral, the actual fact is that, owing to unavoidable variations in the winding of the ribbon, certain considerable lengths of the latter will lie in a circle around the center of the spiral, with the result that these portions will cast shadows upon the plate or film which will appear in the negative as concentric circles. For this reason, there is a limit to the thinness of an efficient screen which can be made with a single spiral of lead ribbon.

The present invention is the result of the realization that the thickness of a screen can be materially reduced, without loss of efficiency, by the use of a plurality of thin lead ribbons arranged in spiral form and with the flare of the spiral increasing from the center of the screen outwardly. The details of the arrangement by which this idea may be carried out, and the advantages thereof, will be hereinafter explained in describing certain of the many forms in which this general idea may be embodied.

Figure 2:
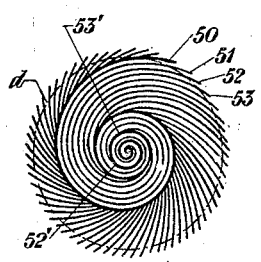
Figure 3:
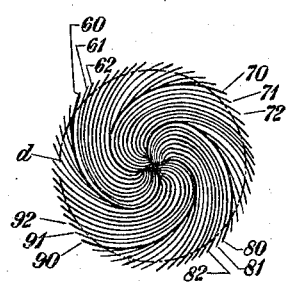
Figure 4:
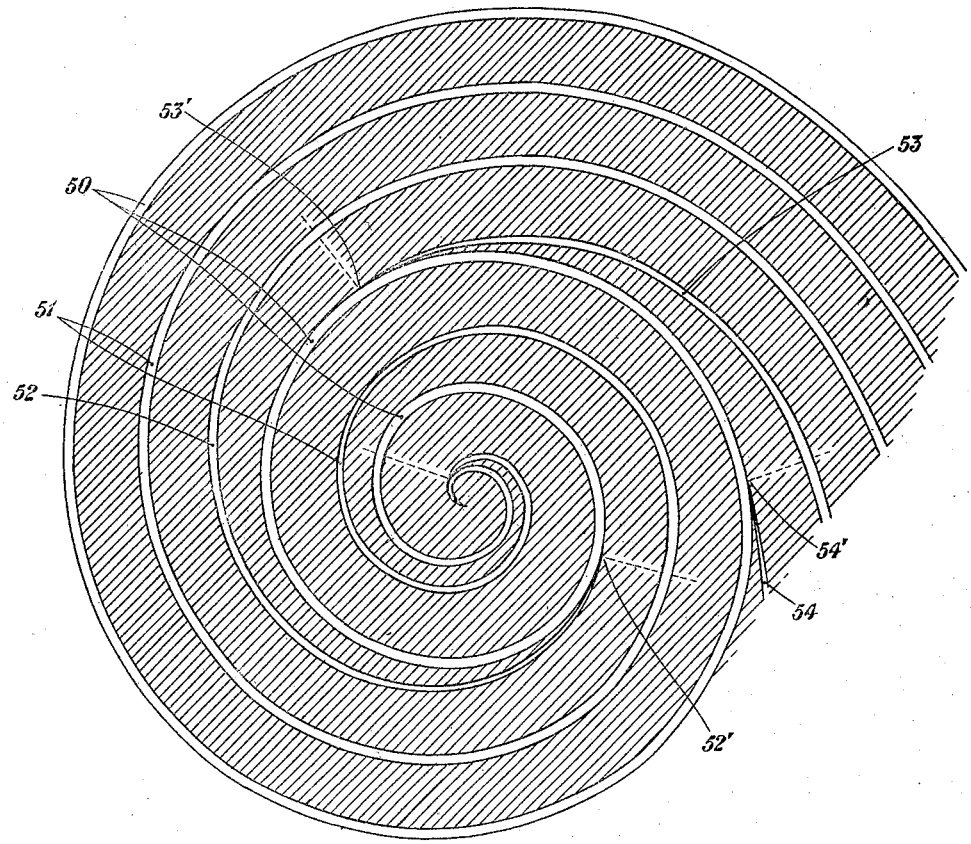
Figure 5:
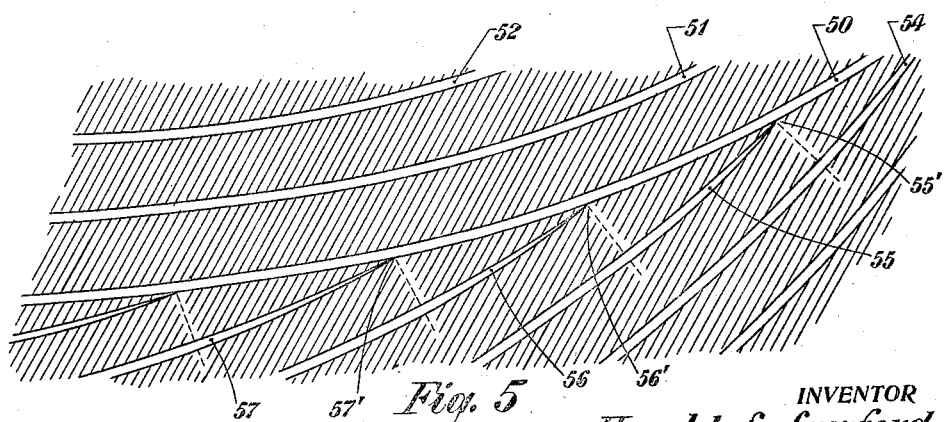
Figure 6:
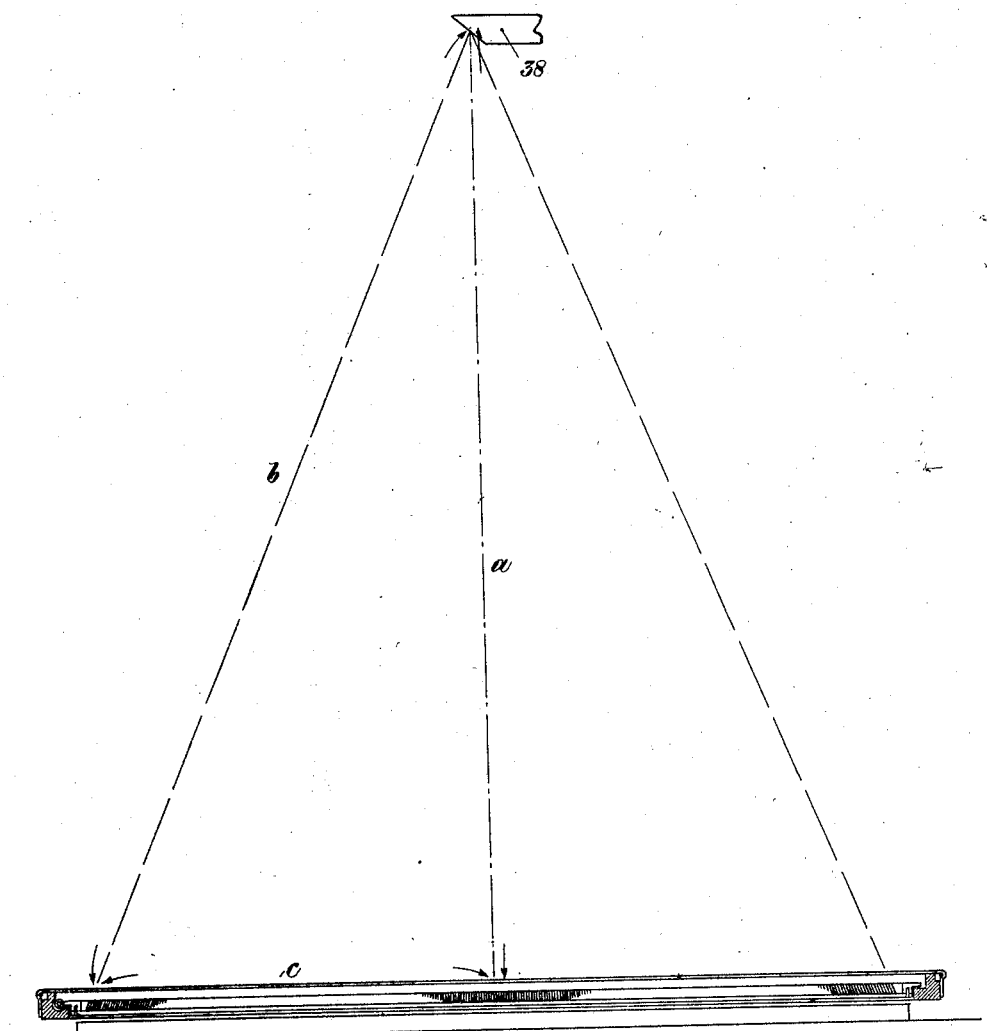
Figure 7:
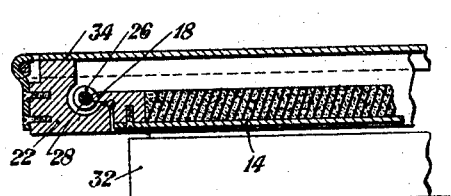
Figure 8:
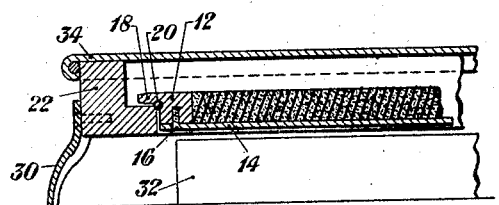
Figure 9:
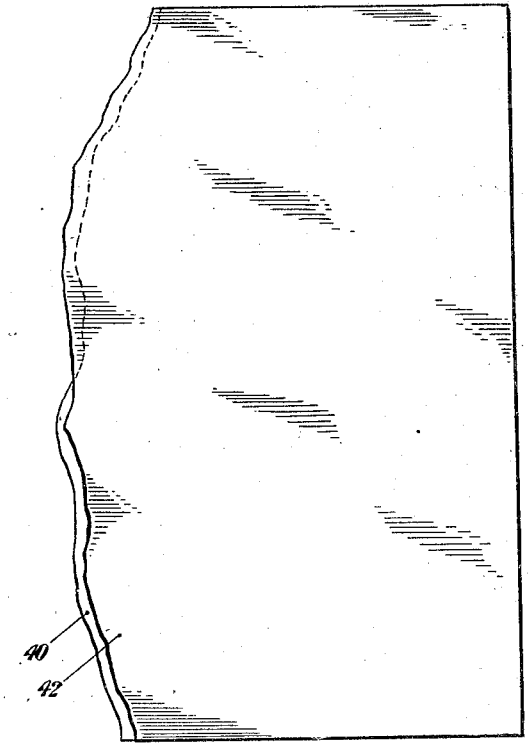
Figure 10:
Figure 11:
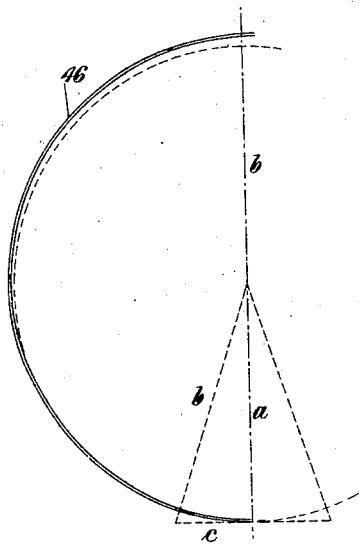

This further description will be given in connection with the accompanying drawings in which Figure 1 is a plan view, partly in section and partly diagrammatic, of a screen embodying the invention; Figure 2 is a detail view of one form of a portion of the center of the screen; Figure 3 is a detail view of the center portion of a modified form of screen; Figure 4 is an enlarged view of the central part of the portion of the screen shown in Figure 2; Figure 5 is a view on an enlarged scale of an intermediate portion of the screen shown in Figure 2; Figure 6 is an elevation, partly in section, of a screen embodying the invention, and the frame in which it is supported and rotated; Figures 7 and 8 are fragmentary elevations showing details of the construction of the screen and supporting frame; Figure 9 shows a piece of material from which the ribbons for making up the screen are cut; Figure 10 is a section thru such material, showing the lead sheet and the spacing material to which it is secured; and Figure 11 is a diagram illustrating how the ribbons may be cut.

Referring to the drawings, particularly Figures 1, 6, 7, and 8, screening material which will be hereinafter described in detail is shown as supported within a horizontal ring 12 to the bottom of which is secured by means of screws 16 a plate 14 of thin aluminum or other material transparent to X-rays. The plate 14 serves as a support for the lead ribbons and the cooperating spacing material which are arranged within the ring 12 in a manner hereinafter described. In order to permit the screen to be rotated while a radiograph is being taken, the ring 12 is rotatably mounted and driven in any suitable manner. As shown, the ring 12 is provided at its upper side with an outwardly projecting flange 18 beneath which is a ball-race adapted to receive balls 20 which roll in a ball-race formed in a ring-shaped frame 22 having the cross sectional form shown best in Figures 7 and 8. The outer edge of the flange 18 is provided with spiral gear teeth 24, with which a worm 26 cooperates. The shaft 28, upon which the worm 26 is mounted, may be driven from any suitable source of power, for example, an electric motor (not shown); and the desired rotation of the ring 12 may thus be provided for. As shown, the frame 22 is supported on legs 30, so as to permit a plate holder 32 to be readily inserted beneath the screen. Extending across the top of the frame 22 is a plate 34 of some material transparent to X-rays, upon which the subject to be radiographed may be supported. The relative locations of the screen and the X-ray tube will be understood from the Figure 6, in which the target of the tube is diagrammatically indicated at 38, it being understood that this target is located as nearly as possible over the center of the screen.

That portion of the screen which serves to reduce the secondary rays which would otherwise reach the plate to be radiographed will now be described. Generally speaking, this portion of the screen comprises ribbons of some material, such as lead, opaque to X-rays, which ribbons are spirally arranged within the ring 12 and upon the plate 14. These spirally arranged ribbons are spaced from one another by ribbons of some material highly transparent to X-rays, such as cork, bakelite, celluloid, etc. In order to permit the primary X-rays to pass thru the screen with minimum interference, the lead ribbons should be arranged at an angle to the vertical so that a vertical cross section thru the center of the screen will cut the various convolutions of the ribbons on lines which if extended would pass thru the point at which the rays originate, that is, the target 38. This will be understood from Figures 6, 7, and 8 which show the inclinations of the lead ribbons. A satisfactory method of cutting the ribbons used in building up the screen, is illustrated in Figures 9, 10 and 11. For convenience, the ribbons of spacing material are secured to the lead ribbons and the two are inserted together in the building up of the screen. Such composite ribbons may be cut from a composite flat sheet which may be formed by securing a sheet 40 of lead to a sheet 42 of the spacing material in any suitable manner, for example, by pressing one sheet upon the other, under the influence of heat, with a binder such as shellac or rubber tissue between them.

The manner in which the composite ribbons may be cut from such a composite flat sheet will be explained by reference to Figures 6 and 11. Referring to Figure 11, which shows how the ribbons are marked out on a flat sheet of composite material, it will be evident that the ribbon 46, having a predetermined length, is curved and has a width corresponding approximately to the thickness of the screen. The arcs bounding such a ribbon 46 are concentric spirals and each is drawn on a radius sector which at its beginning represents the distance $a$ from the target 38 to the center of the screen, and gradually changes until at its end it represents the distance $b$ from the target 38 to the periphery of the screen. It will be obvious that when such composite strips are cut from the flat composite sheet 40—42, they are adapted to be spirally arranged on the plate 14 at the desired angle hereinbefore mentioned.

The reason that strips cut in this way are adapted to incline toward a common focus when placed on edge and wrapped spirally to form a flat screen is as follows. If the surface of a cone, having the lower circumference of the screen as the circumference of its base were spread out flat, it would be found to form a sector of a circle having for its radius the distance from the circumference of the cone base to the apex. This is obviously true, because every point in the circumference of the base is at the same distance from the cone apex. This would also be true of any cone having the same apex and having a circular base in the same plane. But the smaller the base of the cone, the shorter the radius of the sector would be, for as the radius of the circular base diminishes, the distance of the circumference of the base from the apex of the cone diminishes. If a strip is to incline toward the apex of the cone and its lower edge is to form a spiral in the base plane running from the circumference to the center of the base, the strip should be cut from plane stock with a spiral circumference having its maximum radius vector equal to the distance from the apex of the cone to the periphery of the base, and its minimum radius vector equal to the altitude of the cone. All of the spiral strips in the finished screen start at the periphery of the screen and have substantially the same flare. They may therefore be cut upon the same pattern, some, however, being cut considerably shorter than others to avoid wasting material when they are wound together.

Having obtained a supply of composite ribbons in the manner just described, the screen may be built up by arranging these ribbons on the plate 14 in many different ways, of which two will be described with the aid of Figures 1 to 5. Referring first to the form of screen shown in Figures 1, 2, 4 and 5, a first or main composite ribbon 50 is arranged within the ring 12, and extending from a point on its circumference to its center, in the form of a spiral which in the preferred form gradually diminishes its flare near the center. Cooperating with this main ribbon 50, are supplementary composite ribbons which are arranged in the following manner: The first supplementary ribbon 51 is arranged inside the main ribbon 50, of course with the spacing material of the supplementary ribbon in engagement with the lead side of the main ribbon, and said supplementary ribbon follows the spiral of the main ribbon until the inner end of the supplementary ribbon reaches practically to the center of the spiral. The second supplementary ribbon 52 is then laid inside the first supplementary ribbon 51 and is worked in toward the center of the spiral until it touches the convex surface of the main ribbon 50 at the point 52'. The third supplementary ribbon 53 is then laid along-side the previous supplementary ribbon 52 and is worked in toward the center of the spiral until it makes contact with the convex surface of the main ribbon 50 at the point 53'. Additional supplementary ribbons are laid in a similar manner, each within the previous supplementary ribbon, and each terminating on the convex surface of the main ribbon 50 at a point further away from the center of the spiral than the point corresponding to the previous supplementary ribbon. In this manner a superposition of the shadows cast by the ends of different ribbons is entirely avoided. This insertion of supplementary ribbons is continued until there are enough supplementary ribbons within the turns of the main ribbon 50, to completely fill the space between the turns of said ribbons. Or, stating it another way, supplementary ribbons are inserted within the turns of the main ribbon, in the manner above described, until the inner end of the last supplementary ribbon to be inserted makes contact with the convex surface of the main ribbon 50 at a distance from the center of the spiral represented by the radius of a circle $d$; after which the main ribbon 50 and all of the supplementary ribbons 51, 52, 53, etc. are wound up on one another until the diameter of the entire coil equals the diameter of the space within the ring 12 which is to receive the coil. Before the main ribbon 50 and the supplementary ribbons 51, 52, 53, etc. are inserted, their inner ends are tapered so that the junction points of the ribbons will have the same efficiency as the other parts of the screen, and not cast shadows on the exposed plate. This tapering is applied also to the spacing material of which the composite ribbons are made, to permit of the close packing of the ribbons.

The composite ribbons in a screen of the type of which the central portion is shown in Figure 3, are assembled in the same manner as that above described in connection with Figures 1, 2, 4, and 5, except that in the screen of Figure 3 there are four main ribbons 60, 70, 80 and 90, inside of which are laid supplementary ribbons 61—71—81—91, 62—72—82—92, etc. which terminate on the convex surface of the adjacent main ribbon. In assembling the ribbons in the manner shown in Figure 3, care should be taken to see that the various supplementary ribbons terminate at points at different distances from the center of the screen, and the inner ends of the ribbons should be tapered to facilitate a proper packing of the ribbons in their assembled relation.

It will be obvious that screens made in the manner or on the principle above described, will be highly efficient in suppressing secondary rays which would otherwise reach the plate from the object to be radiographed. Owing to the large "flare" of each ribbon, from its inner end toward the circumference of the screen, there is no danger that any portion of any ribbon will lie in the arc of a circle drawn around the center of the screen. This means that, even when the screen is rotated at a comparatively slow speed, a large number of the ribbons will sweep across any portion of the plate or film. This fact, that a relatively large number of strips sweep over every part of the stationary plate, gives complete obliteration of screen shadows for the short exposures which are necessary for good radiography of certain parts. Moreover, slow speed of rotation of the screen is highly desirable, as noise and vibration, both of which are objectionable, may thereby be reduced to a minimum.

Other advantages inherent in screens of the type above described, will be obvious to those skilled in this art; and it will be also understood that the particular forms of screen herein described are merely illustrative, and that the invention may be embodied in many other forms without departing from the spirit thereof.

What I claim is:

1. A screen for suppressing secondary rays in X-rays comprising a plurality of spirally wound ribbons of material impervious to X-rays, certain of said spirally wound ribbons terminating short of the centre of tne screen.

2. In a screen for suppressing secondary rays in X-rays, a plurality of ribbons of material impervious to X-rays which are spirally wound upon one another, said ribbons being arcuate in form, the radius of any given portion of said ribbons being substantially equal to the distance of the corresponding portion of the screen from the centre of projection of the X-rays.

3. In a screen for suppressing secondary rays in X-rays, a spirally wound ribbon of material impervious to X-rays, and additional ribbons of such material spirally wound in with said first-named ribbon, the inner ends of said additional ribbons being located at different points on said first-named ribbon.

4. In a screen for suppressing secondary rays, in X-rays, a spirally wound ribbon of material impervious to X-rays, and additional ribbons of such material spirally wound in with said first-named ribbon, the inner ends of said additional ribbons being arranged in sequence from a point adjacent the inner end of said first-named ribbon.

5. In a screen for suppressing secondary rays in X-rays, a spirally wound ribbon of material impervious to rays, and supplementary ribbons of such material spirally wound in with said main ribbon, the inner ends of said supplementary ribbons being arranged in sequence from a point on said main ribbon adjacent the inner end thereof to a point on said main ribbon several turns away from the inner end thereof.

6. In a screen for suppressing secondary rays in X-rays, a plurality of spirally wound main ribbons of material impervious to X-rays, and supplementary ribbons of such material spirally wound in with said main ribbons, the inner ends of said supplementary ribbons being located at different points on said main ribbons.

7. In a screen for suppressing rays in X-rays, a plurality of spirally wound ribbons of material impervious to X-rays, and groups of supplementary ribbons of such material spirally wound in with said main ribbons, the inner ends of the ribbons in said groups being arranged in sequence from a point adjacent the inner end of one of said main ribbons.

8. A rotary screen of the character described, comprising ribbons of material impervious to X-rays, spaced from each other by ribbons of material highly transparent to X-rays, said alternating transparent and impervious strips being wrapped together into spiral form.

9. A flat screen of the character described, comprising composite ribbons formed of sheet material impervious to X-rays and sheet material highly transparent to X-rays, said composite ribbons being inclined toward a common focus and wrapped together into spiral form, and suitable binding substance between said sheet materials.

10. A screen of the character described comprising composite ribbons formed of sheet material impervious to X-rays and sheet material highly transparent to X-rays, and suitable binding substance between said sheet materials, said ribbons being spirally wound upon one another.

11. A screen of the character described comprising composite ribbons formed of sheet material impervious to X-rays and sheet material highly transparent to X-rays, and suitable binding substance between said sheet materials, said ribbons being spirally wound upon one another, and additional composite ribbons spirally wound in with said first mentioned ribbons, the inner ends of said supplementary ribbons being located at different points on said first mentioned ribbons.

12. A screen, as set forth in claim 3, in which the spirally wound ribbons are spaced from each other by ribbons of material highly transparent to X-rays.

13. The method of making a Roentgenograph screen for suppressing secondary rays which comprises providing a multiplicity of ribbons so formed that they will automatically incline toward a common focus when spirally wrapped together upon a flat support, and spirally wrapping said ribbons together upon a flat support.

14. A screen for suppressing secondary rays in X-rays composed of composite ribbons formed of thin sheet material impervious to X-rays and reinforcing and spacing material transparent to X-rays, said composite ribbons being spirally wrapped together and having their inner ends tapered.

HAROLD S. SAWFORD.